US012675942B2

(12) United States Patent
Clere et al.

(10) Patent No.: US 12,675,942 B2
(45) Date of Patent: Jul. 7, 2026

(54) METHOD AND DEVICE FOR ENHANCING THE DISPLAY OF FEATURES OF INTEREST IN A 3D IMAGE OF AN ANATOMICAL REGION OF A PATIENT

(71) Applicant: MINMAXMEDICAL, Saint-Martin-d'Heres (FR)

(72) Inventors: Arnaud Clere, Saint-Martin-d'Heres (FR); Vivien Delmon, Saint-Martin-d'Heres (FR); Yoann Blein, Saint-Martin-d'Heres (FR); Clément Mirabel, Saint-Martin-d'Hères (FR)

(73) Assignee: MINMAXMEDICAL, Saint Martin d'Heres (FR)

( * ) Notice: Subject to any disclaimer, the term of this patent is extended or adjusted under 35 U.S.C. 154(b) by 493 days.

(21) Appl. No.: 18/083,850

(22) Filed: Dec. 19, 2022

(65) Prior Publication Data

US 2023/0196641 A1 Jun. 22, 2023

(30) Foreign Application Priority Data

Dec. 22, 2021 (EP) .................................... 21306899

(51) Int. Cl.
*G06T 15/20* (2011.01)
*G06T 12/30* (2026.01)

(52) U.S. Cl.
CPC .............. *G06T 15/20* (2013.01); *G06T 12/30* (2026.01); *G06T 2200/04* (2013.01); *G06T 2210/41* (2013.01)

(58) Field of Classification Search
CPC ... G06T 15/20; G06T 19/20; G06T 2219/008; G06T 2210/41; G06T 2200/04; G06T 11/008
See application file for complete search history.

(56) References Cited

U.S. PATENT DOCUMENTS 5,891,030 A * 4/1999 Johnson ................. A61B 6/032
600/407
8,625,869 B2 * 1/2014 Harder .................... G06T 15/08
382/131

(Continued)

FOREIGN PATENT DOCUMENTS

EP        3154030 A1 * 4/2017    ........... A61B 8/0883
EP        3889888 A1    10/2021
WO    WO-2005055496 A2 * 6/2005    ......... A61B 5/02007

OTHER PUBLICATIONS

Netherton Tucker J. et al: "Evaluation of a multiview architecture for automatic vertebral labeling of palliative radiotherapy simulation CT images", Medical Physics., vol. 47, No. 11, Jun. 29, 2020 (Jun. 29, 2020), pp. 5592-5608, XP055927365, ISSN: 0094-2405, DOI: 10.1002/mp.14415 Retrieved from the Internet: URL:https://aapm.onlinelibrary.wiley.com/d oi/full/10.1002/mp.14415>.

(Continued)

*Primary Examiner* — Henok Shiferaw
(74) *Attorney, Agent, or Firm* — Thomas I Horstemeyer, LLP

(57) ABSTRACT

The invention concerns a computer implemented method for enhancing the display of features of interest in a 3D image of an anatomical region of a patient, the method comprising:
a) obtaining a 3D image of an anatomical region of a patient;
b) projecting the 3D image according to a first point of view for obtaining a first 2D image;
b1) projecting the 3D image according to a second point of view for obtaining a second 2D image of said anatomical region;
the first point of view being transverse to the second point of view and the first 2D image being transverse to the second 2D image; the method comprising
c) determining from the first 2D image a first 3D region of interest;

(Continued)

d) projecting said 3D region of interest according to the second point of view for obtaining a third 2D image.

15 Claims, 7 Drawing Sheets

(56) References Cited

U.S. PATENT DOCUMENTS

| | | | | |
|---|---|---|---|---|
| 9,020,218 B2 * | 4/2015 | Hakl | ...................... | G06T 15/08 |
| | | | | 382/128 |
| 9,147,239 B2 * | 9/2015 | Pau | ........................... | G06T 7/62 |
| 2013/0163836 A1 * | 6/2013 | Pau | ......................... | G06T 17/00 |
| | | | | 382/128 |
| 2014/0018682 A1 * | 1/2014 | Baba | ...................... | G16H 50/20 |
| | | | | 600/443 |
| 2014/0152661 A1 * | 6/2014 | Nishiura | ................. | G06T 15/08 |
| | | | | 345/424 |
| 2015/0363963 A1 * | 12/2015 | Zhan | ....................... | G06T 15/08 |
| | | | | 600/410 |
| 2018/0028133 A1 * | 2/2018 | Jones | ......................... | G06T 5/20 |
| 2022/0358692 A1 * | 11/2022 | Bhushan | ................ | G06T 12/30 |

OTHER PUBLICATIONS

Perklab Research: "New "Surface cut" and "Mask volume" tools for 3D Slicer segment editor", Jul. 17, 2017 (Jul. 17, 2017), XP055927011, Retrieved from the Internet: URL:https://www.youtube.com/watch?v=xZwyW6 SaoM4.

* cited by examiner

METHOD AND DEVICE FOR ENHANCING THE DISPLAY OF FEATURES OF INTEREST IN A 3D IMAGE OF AN ANATOMICAL REGION OF A PATIENT

CROSS REFERENCE TO RELATED APPLICATIONS

This claims the benefit of European Application No. EP 21306899.2, filed Dec. 22, 2021, which is hereby incorporated by reference herein in its entirety.

FIELD OF THE INVENTION

The invention concerns a method and a system for allowing appropriate display for assisting a diagnostic, or a manual or a robot assisted intervention, or the planning of such intervention, in a region of interest of the patient. In particular, the invention concerns a method and a system for enhancing the display of features of interest in a 3D image of an anatomical region of a patient. The invention can also be used during a navigation of a medical instrument.

BACKGROUND OF THE INVENTION

When examining a medical image, a practitioner may have to precisely and unambiguously identify an anatomical feature, for example a patient's vertebra pedicle.

To do so, the practitioner must be able to visualize the region of interest, the anatomical feature by means of 2D representation(s) of the region of interest obtained by a medical imaging device.

Such visualization can be advantageous when a diagnostic in a region of interest must be performed: for planning an intervention in this region of interest, or for the intervention as such in this region for interest.

However, relevant anatomical features are often hidden by other irrelevant information located in front of or behind the region of interest, or by voxels which intensities are out of the intensity range in the region of interest.

SUMMARY OF THE INVENTION

The invention allows the practitioner to eliminate irrelevant anatomical information displayed on a projection of a region of interest.

To this end, the invention, according to a first aspect, concerns a computer implemented method for enhancing the display of features of interest in a 3D image of an anatomical region of a patient, the method comprising:

a) obtaining a 3D image of an anatomical region of a patient;

b) projecting the 3D image according to a first point of view for obtaining a first 2D image;

b1) projecting the 3D image according to a second point of view for obtaining a second 2D image of said anatomical region;

the first point of view being transverse to the second point of view and the first 2D image being transverse to the second 2D image; the method comprising c) determining from the first 2D image a first 3D region of interest;

d) projecting said 3D region of interest according to the second point of view for obtaining a third 2D image.

The invention according to the first aspect, may be completed by one or several of the features, alone or in combination as follows:

the method comprises a step of determining from the third 2D image a second 3D region of interest; and a step of projecting said second 3D region of interest according to the first point of view for obtaining a fourth 2D image;

the step of determining the first or second 3D region of interest comprises the sub-steps of: defining a 2D region on one of the first or second 2D image; obtaining from said 2D region and the 3D image, the first or second 3D region of interest, the 2D region being the projection of the first or second 3D region of interest according to the transverse point of view to the one of the first or second 2D image;

the step of defining the 2D region comprises a step of defining a central line and a first line at a first distance of the central line and a step of defining a second line at a second distance of the central line, said 2D region being delimited by the first line and the second line on both sides of the central line;

the first distance is different or equal to the second distance;

the central line is defined by a point and a direction, the central line being computed from the point and the direction, wherein the point and the direction are determined manually or automatically;

the step of defining the 2D region comprises a step of defining a circle on the first or second 2D image, a central line being defined relative to the center of the circle as defined, and preferably crosses the center;

the step of defining a 2D region on the first 2D image is implemented automatically or manually;

the method comprises a step of filtering the first and/or second 3D region of interest so as to keep the pixels or voxels having levels defined with respect to a predetermined threshold, in the first or second 3D region of interest;

the method comprises a step of filtering the first and/or second 3D region of interest so as to keep the pixels or voxels having levels higher than the maximum value of a percentage of the pixels or voxels of lower level in the first or second 3D region of interest;

the method comprises a step of filtering the first and/or second region of interest so as to keep the pixels or voxels having levels lower than the maximum value of a percentage of the pixels or voxels of higher level in the first or second 3D region of interest;

the 3D image is selected among a plurality of 3D images; the selection being implemented automatically or manually;

the method comprises a step of displaying the 2D images;

the first point of view is orthogonal to the second point of view.

According to a second aspect, the invention concerns medical imaging system comprising a processor configured for implementing the computer implemented method according to the first aspect of the invention.

BRIEF DESCRIPTION OF THE DRAWINGS

Other features and advantages of the invention will appear in the following description. Embodiments of the invention will be described with reference to the drawings, in which

FIGS. 4a, 4b, 4c and 4d illustrate several embodiments for the definition of a region of interest in the method of the invention;

DETAILED DESCRIPTION OF THE INVENTION

Medical Imaging System

Figure 1:
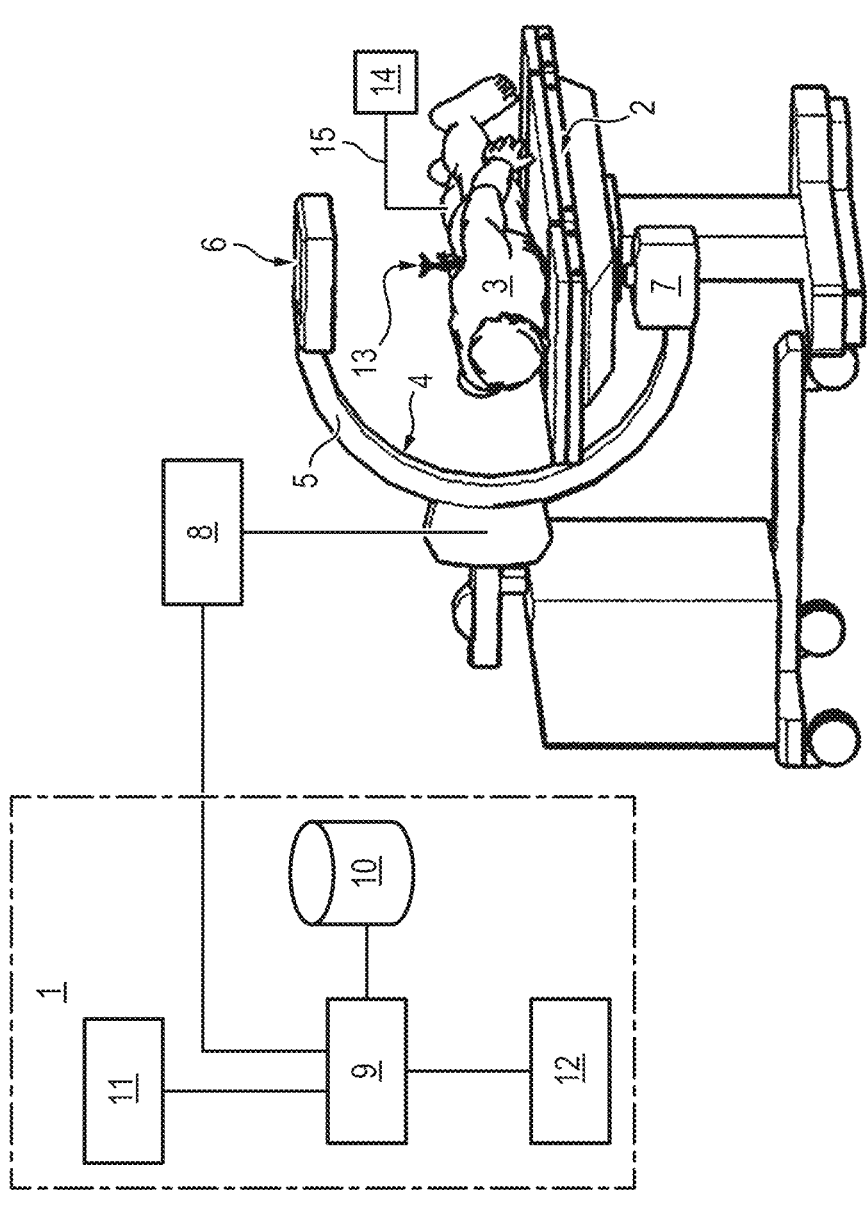
FIG. 1 illustrates a medical imaging system and a display system according to an embodiment of the invention.

FIG. 1 illustrates a medical imaging system 1 comprising an operating table 2 on which a patient 3 may be disposed. In particular, the patient 3 may lie on this table 2 for surgical spine procedure for instance. The medical imaging system 1 may also be used in various types of medical interventions, including surgery and interventional radiology.

The medical imaging system 1 may also be linked or integrated with a device 4 for acquiring medical images comprising a detector 6 and an X-ray source 7. The X-ray source 7 and the detector 6 are, in particular, mounted facing each other. This device 4 may be a cone beam computed tomography (CBCT) or a computed tomography (CT) imaging system both well known in the art. The detector 6 and the X-ray source 7 may be arranged at ends of a C-arm 5 which is preferably rotatably mounted around the operating table 2 for acquiring images according to different positions of the C-arm relative to the patient 3.

The device 4 comprises a control unit 8 (such as a computer) for controlling the device, reconstructing 3D images from acquired 2D images, and sending them to the medical imaging system 1. To this end, the control unit 8 is connected to the medical imaging system 1 by means of any suitable communication link.

The medical imaging system 1 comprises a storage unit 10 configured for storing at least the acquired and reconstructed images, and a processing unit 9 for processing images. Furthermore, the medical imaging system 1 comprises one or several display(s) 11 for the display of images or other parameters that the practitioner needs.

By display we mean any suitable device for displaying information to the practitioner: means suitable for augmented reality, virtual reality, computer screen, means for projecting images, etc. In any case, the invention cannot be limited to a particular display.

The medical imaging system 1 permits to explore a region of interest of a patient in which a diagnostic, planning, or intervention must be performed.

The medical imaging system 1 can include elements for the navigation of an instrument. These elements can be used, for facilitating the gesture of the practitioner or control the gesture of a robot when he manipulates an instrument inserted into the patient. To do so, a tracking system 12 can be connected to the system 1, thus permitting to track the instrument relative to the patient and the images relative to the patient. As known, the tracking system 12 can be an optical tracking system, an electromagnetic tracking system, an ultrasonic tracking system, an inertial tracking system, a mechanical tracking system, or any combination of those. The tracking system locates the position of a tracker 14 attached to an instrument 15 with respect to a reference tracker 13 attached to a patient anatomical structure.

The instrument is, preferably, a linear instrument such as a trocar, a needle, a drill or equivalent. Alternatively, the instrument may be a planar instrument with a principal axis, such as a saw with the median axis of the cutting plane. The instrument equipped with a tracker can be navigated freehand or inserted in a guide held by a robot or actively moved by a robot.

Method

Figure 2:
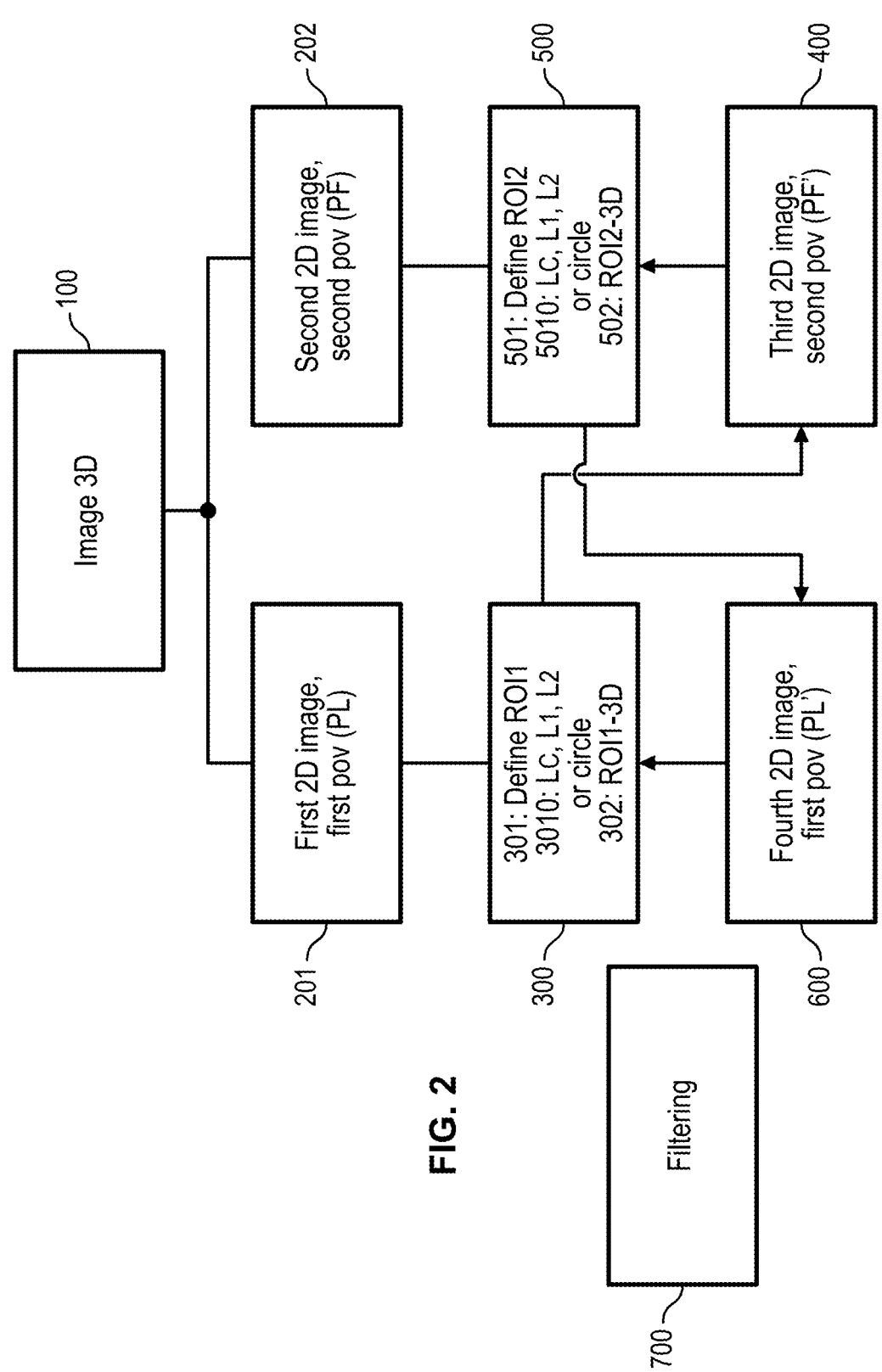
FIG. 2 illustrates steps of a method according to the invention.

In the following we describe a method for processing images for enhancing the display of features of interest in a 3D image of an anatomical region of the patient in relation to FIG. 2.

The method comprises a step of obtaining a 3D image of a region of an anatomical region of the patient (step 100). As known, this 3D image of this region can be obtained from 2D images (or projections or 2D projections) acquired according from different positions of the C-arm or CT scanning system in the referential of the medical imaging system. In particular, the 3D image is obtained by a tomography reconstruction process of the region.

The 3D image can be obtained before the surgery. Advantageously, a calibration between the 3D image and the patient is also performed by determining a geometric relationship between the imaging system 1 and the patient.

The 3D image can also be acquired during the surgery. In a preferred embodiment, an intraoperative CBCT made of a motorized C-arm is used to generate a 3D image from a plurality of X-ray 2D projections.

The obtention of the 3D image is well known by the man skilled in the art and will not be described further.

The 3D image is then projected according to a first point of view and according to a second point of view (step 201, step 202) for obtaining a first 2D image and a second 2D image of the anatomical region.

The first and second points of view depend on the most appropriate point of view for the medical intervention. This point of view can be defined manually by the practitioner or automatically depending on anatomical features to be visualized so as to, e.g., maximize the visibility of an anatomical structure (e.g., spine) or follow a targeted axis or plane.

Advantageously, the first and second points of view are different, the first point of view being preferably transverse to the second point of view. For instance, the first point of view is a lateral direction while the second point of view is a front direction. More generally, the first point of view can be orthogonal to the second point of view.

These 2D images are defined as the projections of the voxels of the 3D image from these two points of view and thus illustrate the anatomical region in 2D according to each of these points of view onto a 2D plane.

These 2D images or projections thus project several 3D voxels onto a single 2D pixel. In particular, these 2D images provide an overall view of anatomical features in an anatomical region of the patient according to different points of view.

These 2D images can be obtained from the patient itself or by simulation as described here below.

According to an embodiment, a 2D image is a radiographic image whose pixels quantify a level of X-ray absorption by the 3D anatomy of the patient according to an X-ray source and direction to the X-ray detector found e.g., in CBCT imaging systems.

According to another embodiment, a 2D image can be computed from a 3D image to simulate radiographs and are well known as Digitally-Reconstructed Radiographs (DRR)

as described in document U.S. Pat. No. 7,653,226. Such DRR avoid having to expose the patient to repeated doses of radiation to generate a specific projection needed. In the case of CT scanner which use 1D X-ray detectors, it may be the only physical solution to present radiographic images to practitioners.

According to another embodiment, a 2D image can be a well-known Maximum Intensity Projection (MIP) computed by retaining for each 2D pixel the maximum intensity value of all the 3D voxels projected onto it.

Figure 3B:
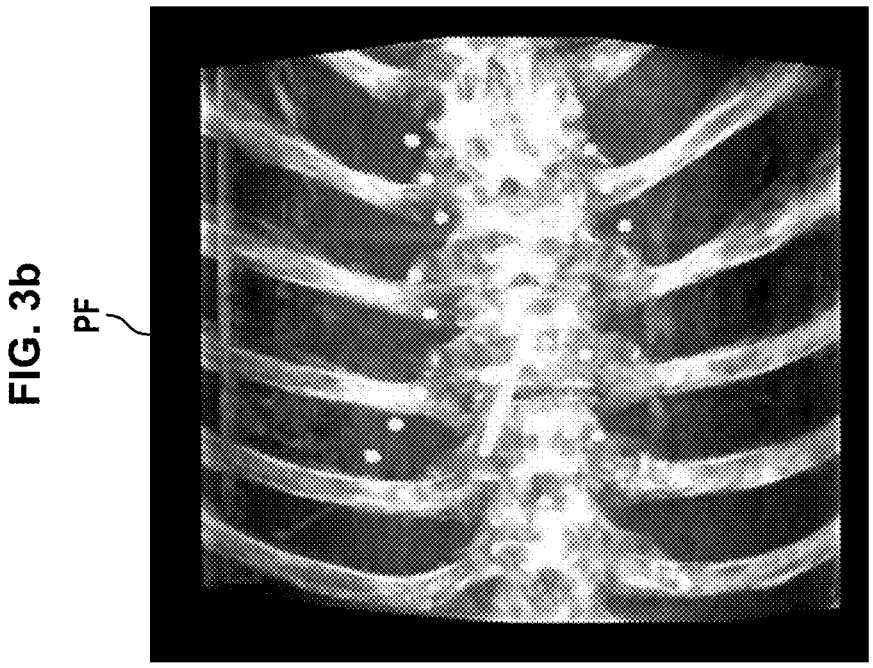
FIGS. 3a, 3b illustrate respectively a lateral view and a front view of an anatomical region of a patient.
Figure 3A:
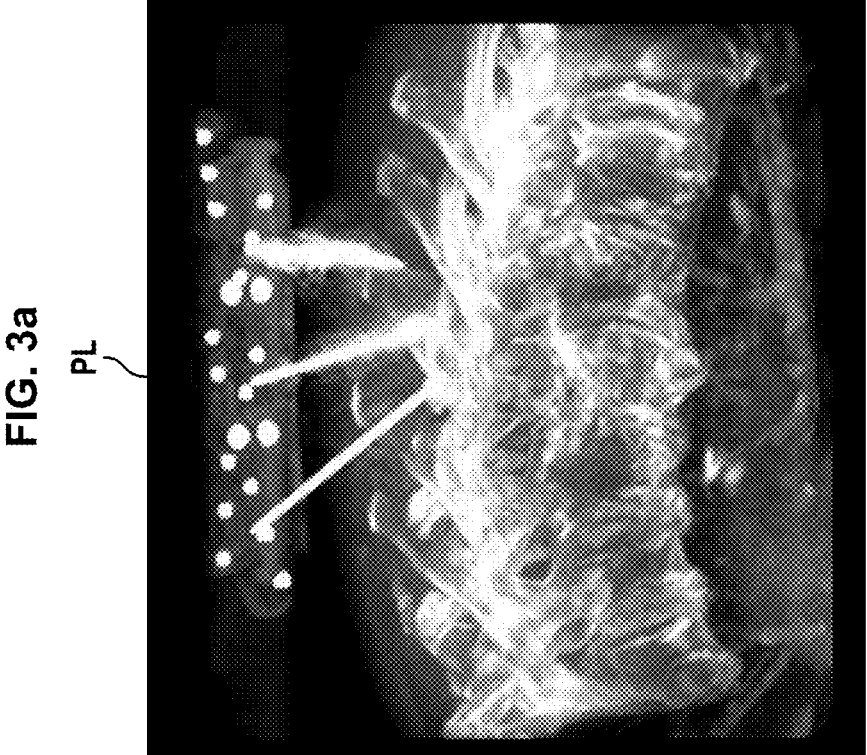

FIG. 3a illustrates a 2D image of an anatomical region viewed according to a lateral point of view and FIG. 3b illustrates a 2D image of the same anatomical region viewed in a front point of view. In particular, FIGS. 3a and 3b display thoracic vertebrae and ribs, along with radio-opaque fiducials.

When a practitioner needs to intervene in the structure of the anatomical region viewed on FIG. 3a, the practitioner needs to see the structure according to another point of view like the one on FIG. 3b.

To this end, the first 2D image is used for determining a first 3D region of interest to be viewed (step 300).

FIGS. 4a, 4b, 4c and 4d illustrate several embodiments for defining the region of interest around a central line firstly defined on that region.

Figures 4A, 4B:
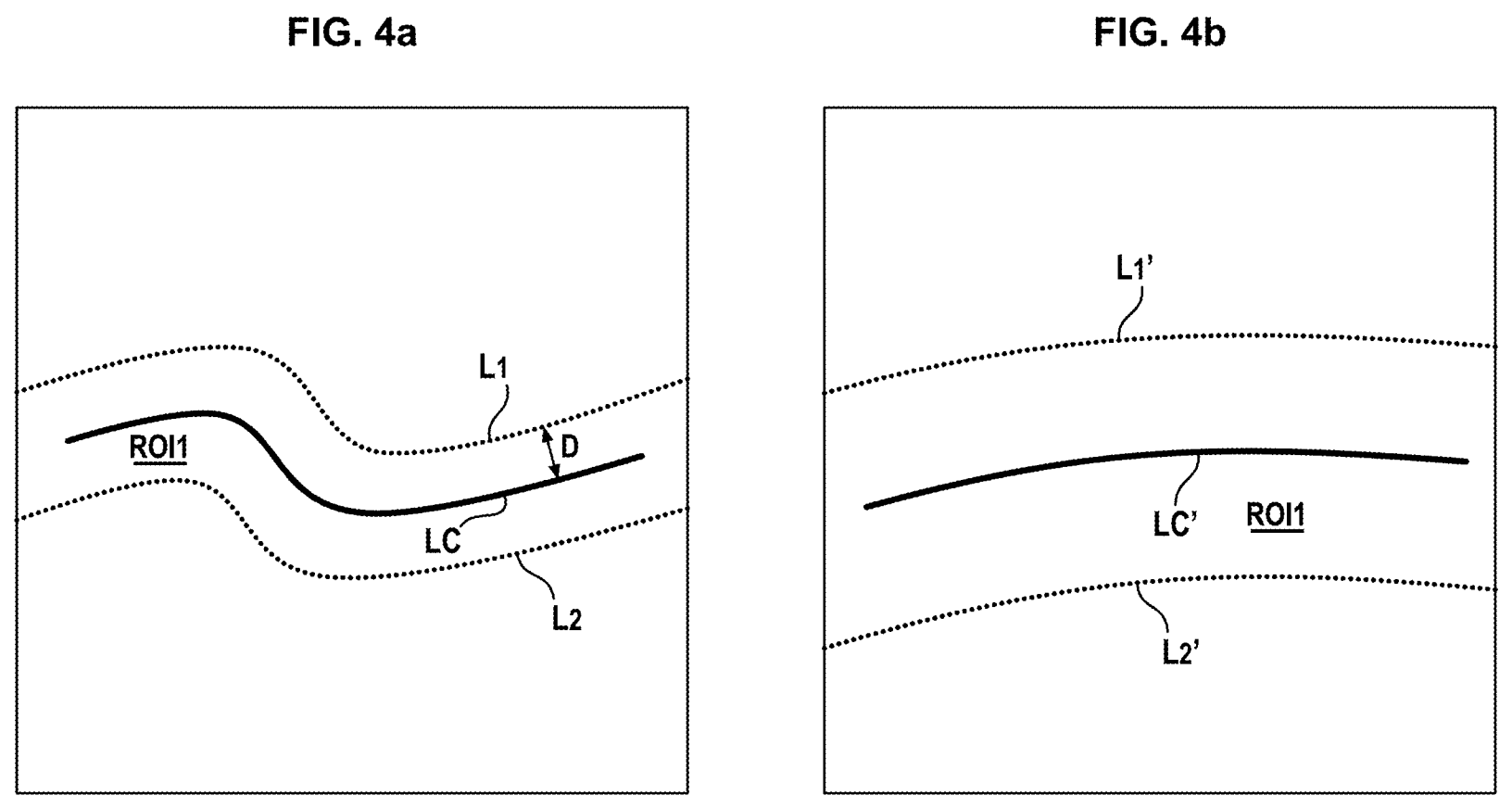

As illustrated on FIGS. 4a and 4b, this first 3D region of interest is preferably obtained by defining a first 2D region of interest ROI1 on the first 2D image (step 301) and by obtaining the corresponding first 3D region of interest ROI1-3D in the 3D image so that the first 2D region of interest ROI1 corresponds to the projection of the first 3D region of interest according to the first point of view.

Figures 4C, 4D:
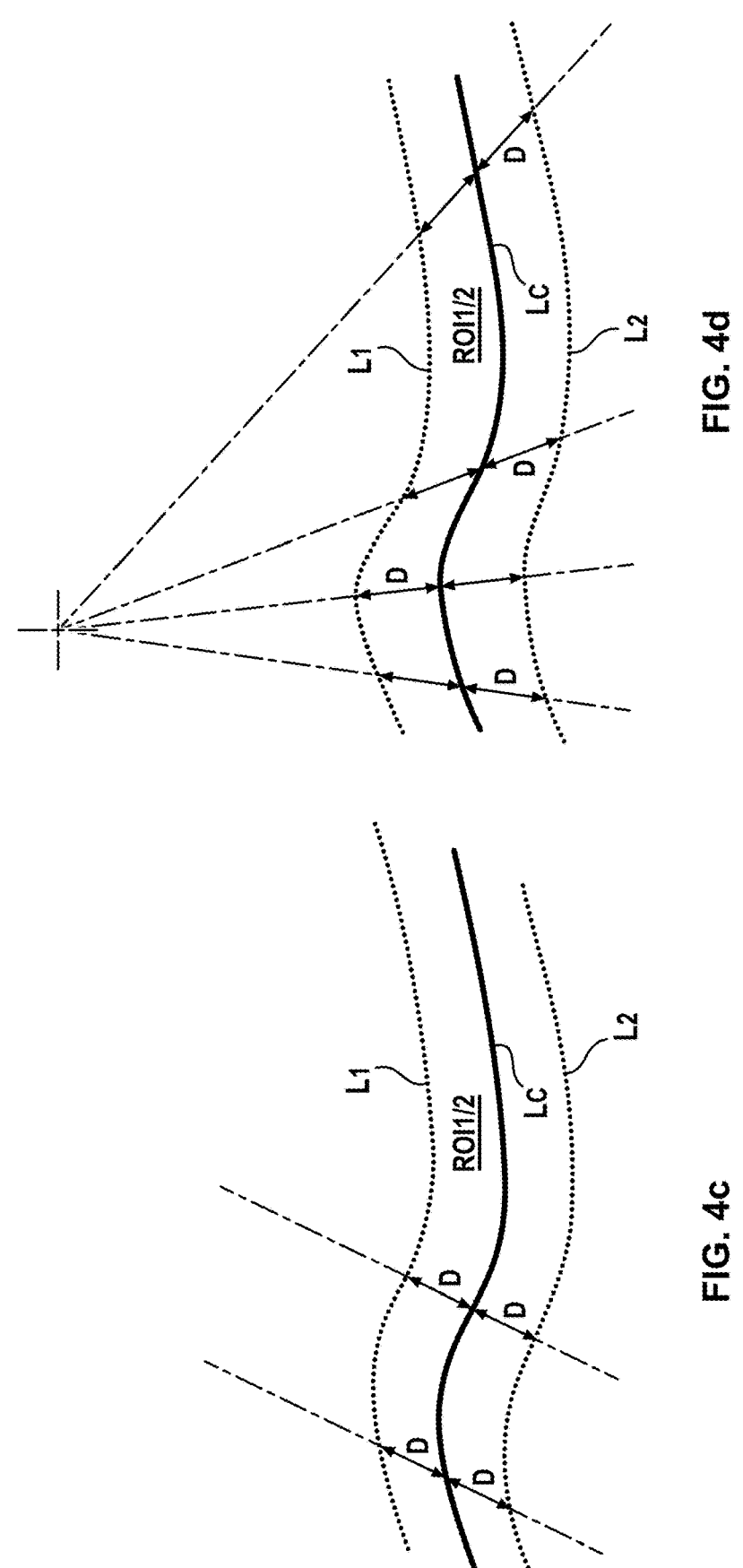

As illustrated on FIG. 4a, the first 2D region of interest ROI1 is delimited by a first line $L_1$ and a second line $L_2$ different from the first line $L_1$, the first line $L_1$ and the second line $L_2$ being at a distance D on both sides of a central line $L_C$. Here, the first line $L_1$ and the second line $L_2$ are at equal distance from the central line Lc. However, as illustrated in FIGS. 4c and 4d it is not necessarily the case. Indeed, the distances between the first or second line and the central line can be different. On FIG. 4c, the distances D on both sides of the central line are equal. Such definition of the region of interest corresponds to the visualization of the region from the infinite. On FIG. 4d, the distances D on both sides of the central line Lc are different. Such definition corresponds to the visualization of the region from a specific point of view.

The definition of the first 2D region can be made manually by the user examining the anatomical region of the patient or automatically. In case, the first 2D region is defined automatically, a validation from the user can be requested.

As illustrated on FIG. 4b, the first 3D region ROI1-3D of interest is then projected according to the second point of view for obtaining a third 2D image (step 400). Therefore, the structure defined by means of the first 2D image can be viewed with more accuracy. FIG. 4b illustrates the projection of the first 2D region of interest defined on FIG. 4a which is now delimited by the corresponding lines L1' and L2' on both sides of a central line $L_C$'. To do that, the definition of the first 2D region of interest comprises a step 3010 of defining a central line $L_C$ and a first line $L_1$ at a first distance $D_1$ of the central line $L_C$ and defining a second line $L_2$ at a second distance $D_2$ of the central line $L_C$, the 2D region being delimited by the first line $L_1$ and the second line on both sides of the central line $L_C$. The central, first and second lines can be defined manually by the user examining the anatomical region of the patient, or automatically. In that last case, a validation from the user can be requested.

According to an embodiment, the central line $L_C$ is defined by a point $P_C$ and a direction $D_C$, the central line $L_C$ being computed from the point and the direction, wherein the point $P_C$ and the direction $D_C$ are determined manually or automatically. Again, when the determination is automatic, a validation from the user can be requested.

For instance, the point Pc is chosen by the user on the second 2D image PF, and the direction Dc is computed to be orthogonal to the first point of view corresponding to the second 2D image or computed by an algorithm based on the 3D image.

Figure 5B:
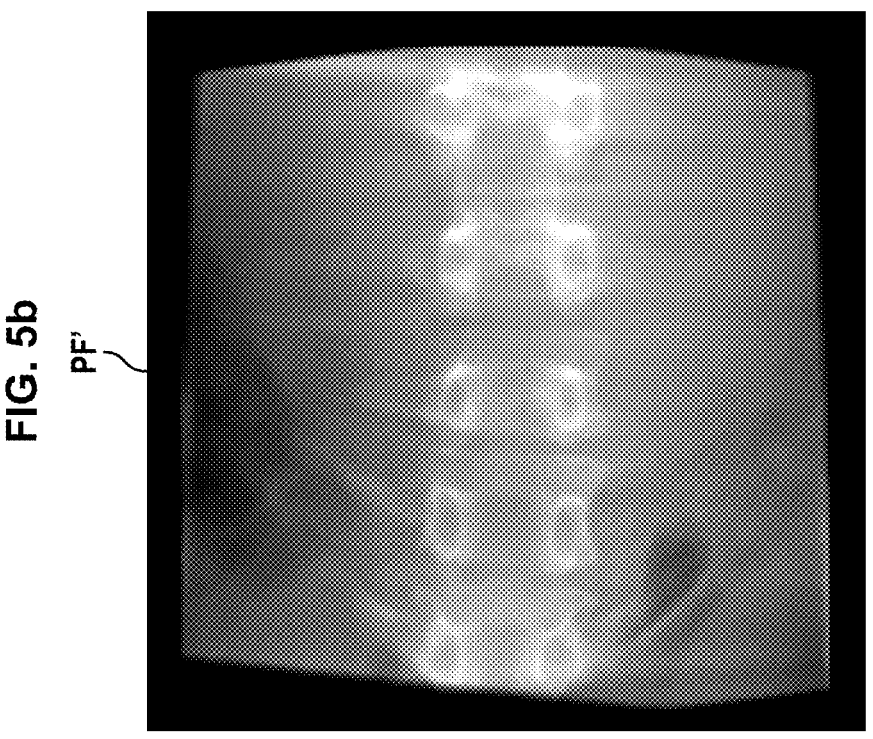
FIGS. 5a and 5b illustrate respectively the lateral view of FIG. 3a in which a region of interest is defined and the front view of FIG. 3b in which irrelevant information is suppressed.
Figure 5A:
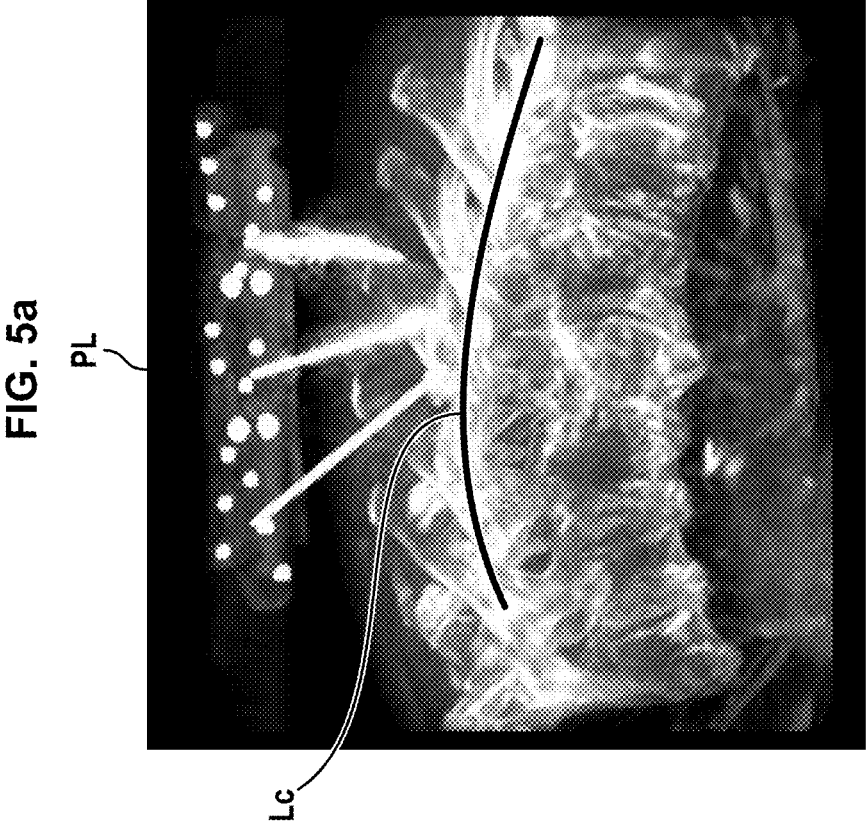

FIG. 5a illustrates the first 2D image wherein a first 2D region of interest is defined and FIG. 5b illustrates the third 2D image where irrelevant information of the second 2D image has been removed. In particular, on FIG. 5a vertebras are shown and the user for visualizing the pedicles define the central line Lc corresponding to the center of the first 2D region of interest. This first 2D region of interest is thus projected according to the second point of view for obtaining a view of the pedicles as shown of FIG. 5b.

Figure 6B:
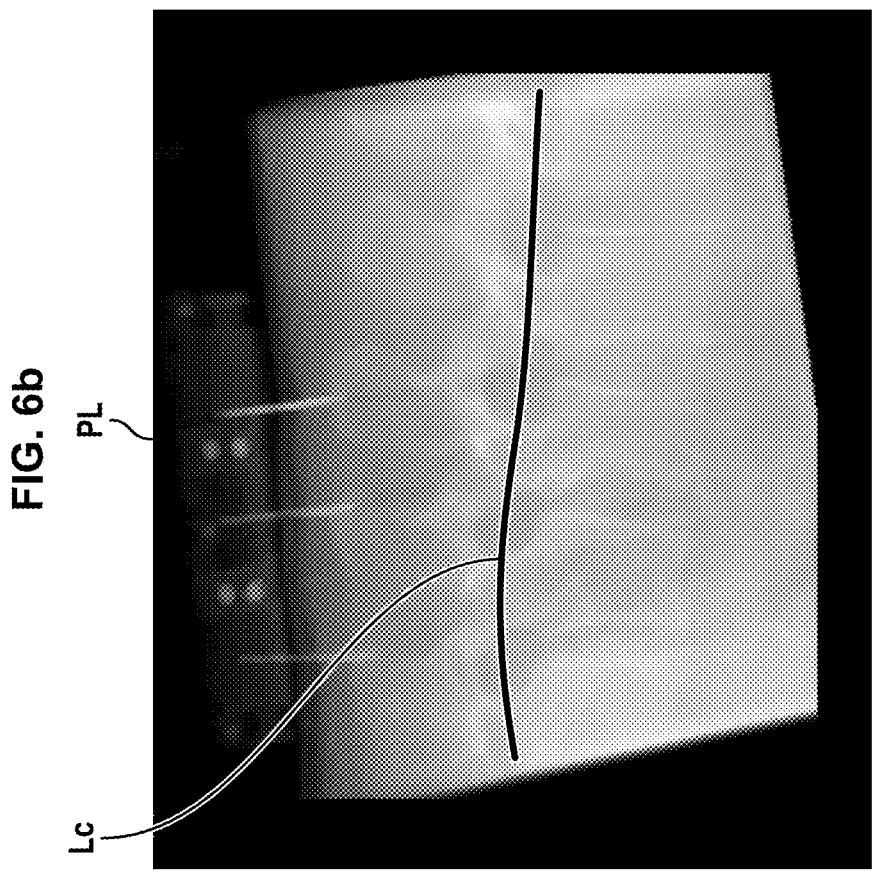
FIG. 6b illustrates the corresponding lateral view in which irrelevant information is suppressed.
Figure 6A:
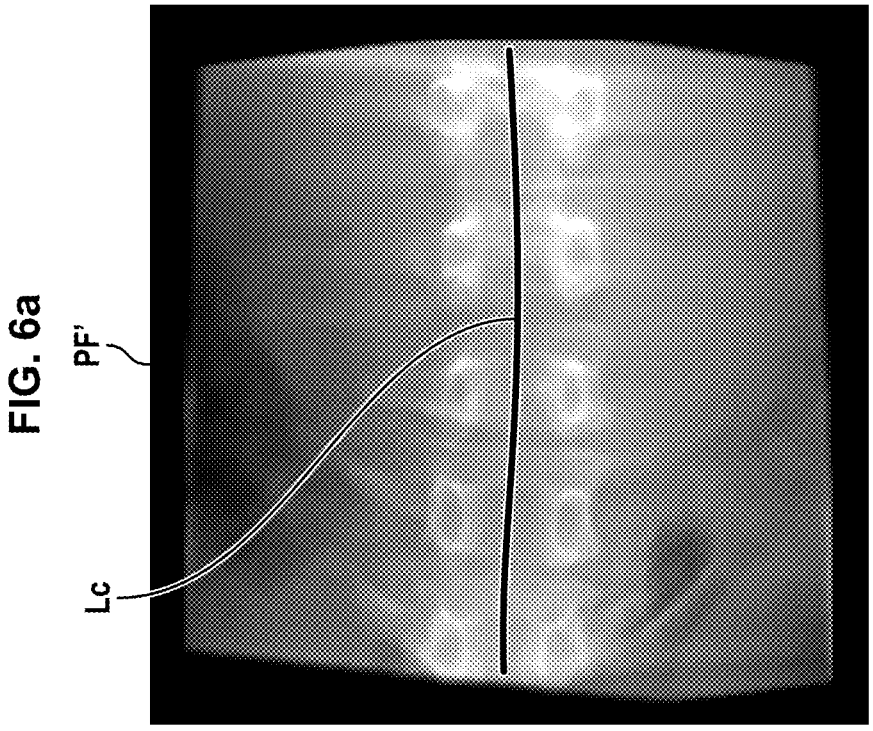
FIG. 6a illustrates the view of FIG. 5b in which a region of interest is defined.

FIG. 6a corresponds to the third 2D image illustrated on FIG. 5b now used for defining a second 2D region of interest to be projected according to a point of view transverse to the point of view according to which FIG. 6a is projected. In particular, in that case the user needs to enhance the visualization of the right pedicles. To do so, the user draws a circle and the second region of interest is defined from the center of this circle by defining a central line Lc having a direction identical to the one of FIG. 5b, such central line Lc crossing the center of the drawn circle. For instance, the center of the circle drawn by the user can be determined automatically and, optionally, validated by the user. Therefore, by projecting this second 2D region of interest a fourth image is obtained as illustrated on FIG. 6b. In this FIG. 6b the visualization of the right pedicles is enhanced, as these right pedicles have been isolated from the left ones thanks to the projection of the second 2D region of interest drawn on the third 2D image.

Thus, the definition of the region of interest in the first projection permits to define a region that the practitioner wants to display accurately.

By means of the third 2D image it is thus possible to define another region of interest (step 500) by defining a third 2D region of interest ROI3 (step 501) and then a third 3D region of interest (step 502) to be projected according to the first point of view for obtaining a fourth 2D image (step 600). These steps can be implemented iteratively for allowing the practitioner to define the relevant region of interest during the intervention. The determination of the third 2D region of interest comprises identical steps as those implemented for determining first and second 2D regions of interests (see steps 3010 corresponding to step 5010, step 302 corresponds to step 502).

In addition, the regions of interest (2D or 3D) obtained during the method can be filtered (step 700) to enhance the contrast of the corresponding image. By the filtering it is possible to remove irrelevant structures which voxels' intensities are out of the intensity range of the region of interest. Such irrelevant structures hiding crucial structures.

According to an embodiment, the filtering permits to keep the pixels or voxels having levels defined with respect to a predetermined threshold. In particular, it is possible to select a subset of voxels or pixels especially those having levels higher than the maximum value of a percentage of the pixels or voxels of lower level.

Alternatively, it is possible to select a subset of voxels or pixels especially those having levels lower than the maximum value of a percentage of the pixels or voxels of higher level.

The levels for the filtering are determined in the first or second 3D region of interest. The use of the 3D region of interest for defining the levels permits to obtain an efficient filtering. For example, using the pixels of the image 3D initially determined is less efficient for taking into account the percentage of the bones.

For instance, the percentage can be between 2% and 20%, preferably 10%.

During each step, the 2D images can be displayed preferably in a specific window, on a display such as e.g., computer screens, augmented reality display (using glasses, semi-transparent screen, projectors, etc.), or other display that can be used by a practitioner in order to examine a medical image, or plan or conduct an intervention on a patient.

The invention claimed is:

1. A computer implemented method for enhancing the display of features of interest in a 3D image of an anatomical region of a patient comprising:

obtaining, from a medical imaging device, a 3D image of an anatomical region of a patient comprising several voxels;

projecting the 3D image according to a first point of view for obtaining a first 2D image, comprising several pixels;

projecting the 3D image according to a second point of view for obtaining a second 2D image of the anatomical region, the first point of view being transverse to the second point of view and the first 2D image being transverse to the second 2D image comprising several pixels;

displaying the first 2D image and the second 2D image;

defining a first 2D region of interest on the first 2D image;

backprojecting according to the first point of view the first 2D region of interest into a first 3D region of interest, projecting the first 3D region of interest according to the second point of view for obtaining a third 2D image comprising several pixels; and displaying the third 2D image.

2. The computer implemented method of claim 1, further comprising:

determining from the third 2D image a second 3D region of interest; and projecting the second 3D region of interest according to the first point of view for obtaining a fourth 2D image comprising several pixels;

displaying the fourth 2D image.

3. The computer implemented method of claim 2, wherein determining from the first 2D image the first 3D region of interest or determining from the third 2D image the second 3D region of interest comprises:

defining a 2D region on one of the first or third 2D image; and obtaining from the 2D region and the 3D image a first or second 3D region of interest, the 2D region being the projection of the first or second 3D region of interest according to the transverse point of view to the one of the first or third 2D image.

4. The computer implemented method of claim 3, wherein defining the 2D region on one of the first or third 2D image comprises:

defining a central line;

defining a first line at a first distance from the central line; and defining a second line at a second distance from the central line, a 2D region being delimited by the first line and the second line on both sides of the central line.

5. The computer implemented method of claim 4, wherein the first distance is different or equal to the second distance.

6. The computer implemented method of claim 4, wherein defining the central line comprises:

determining manually or automatically a point and a direction on the first or third 2D image; and computing a central line from the point and the direction.

7. The computer implemented method of claim 3, wherein defining the 2D region on one of the first or third 2D image comprises defining a circle on the first or third 2D image and a central line through the center of the circle.

8. The computer implemented method of claim 3, wherein defining the 2D region on the first 2D image comprises defining automatically or manually a 2D region on the first 2D image.

9. The computer implemented method of claim 2, further comprising filtering at least one 3D region of interest so as to keep pixels or voxels having levels defined with respect to a predetermined threshold in the first or second 3D region of interest.

10. The computer implemented method of claim 2, further comprising filtering at least one 3D region of interest so as to keep the pixels or voxels having levels higher than the maximum value of a percentage of the pixels or voxels of lower level in the first or second 3D region of interest.

11. The computer implemented method of claim 2, further comprising filtering at least one 3D region of interest so as to keep the pixels or voxels having levels lower than the maximum value of a percentage of the pixels or voxels of higher level in the first or second 3D region of interest.

12. The computer implemented method of claim 1, wherein obtaining the 3D image of the anatomical region of the patient comprises obtaining automatically or manually among a plurality of 3D images a 3D image of an anatomical region of a patient.

13. The computer implemented method of claim 1, further comprising displaying the first 2D image, the second 2D image and the third 2D image.

14. The computer implemented method of claim 1, wherein the first point of view is orthogonal to the second point of view.

15. A medical imaging system comprising:

a medical imaging device for obtaining a 3D image of an anatomical region of a patient comprising several voxels; and a processor configured to:

project the 3D image according to a first point of view for obtaining a first 2D image comprising several pixels;

project the 3D image according to a second point of view transverse to the first point of view and the first 2D image for obtaining a second 2D image of the anatomical region comprising several pixels;

define a first 2D region of interest on the first 2D image:

backproiect according to the first point of view the first 2D region of interest into a first 3D region of interest;

project the first 3D region of interest according to the second point of view for obtaining a third 2D image comprising several pixels; and a display unit configured to display the second 2D image and the third 2D image.

* * * * *